United States Patent [19]
Greene, Jr.

[11] Patent Number: 5,979,428
[45] Date of Patent: Nov. 9, 1999

[54] WIND GUARD ATTACHMENT FOR PORTABLE GAS COOKERS

[76] Inventor: George J. Greene, Jr., 19970 Holly Hills Dr., LaRue, Tex. 75770-9756

[21] Appl. No.: 09/277,028

[22] Filed: Mar. 25, 1999

Related U.S. Application Data

[60] Provisional application No. 60/114,423, Dec. 31, 1998.

[51] Int. Cl.[6] .................................................. F24C 5/20
[52] U.S. Cl. .................................. 126/38; 126/40; 126/50
[58] Field of Search .................................. 126/9 R, 9 A, 126/25 R, 38, 40, 50, 29, 30, 261, 262

[56] References Cited

U.S. PATENT DOCUMENTS

| | | | |
|---|---|---|---|
| 3,960,134 | 6/1976 | Scott | 124/24 |
| 4,722,322 | 2/1988 | Varney | 126/9 R |
| 4,726,350 | 2/1988 | Steinhauser | 126/38 |
| 4,759,339 | 7/1988 | Hefling | 126/38 |
| 4,776,318 | 10/1988 | Serra et al. | 126/50 |
| 5,284,126 | 2/1994 | Varney | 126/50 |
| 5,329,917 | 7/1994 | Young | 126/29 |
| 5,456,162 | 10/1995 | Polizzotto | 99/433 |
| 5,542,347 | 8/1996 | Joseph | 99/422 |
| 5,682,872 | 11/1997 | Whitted | 126/29 |
| 5,842,463 | 12/1998 | Hall | 126/9 R |

*Primary Examiner*—James C. Yeung
*Attorney, Agent, or Firm*—C. W. Alworth

[57] ABSTRACT

A retrofitable wind screen for portable gas cookers. The device, made of sheet metal, readily adjusts to fit almost any portable gas cooker and fits around the outside of the cooker frame extending a minimum of three inches above the cooker grate. The device shields the gas flame from the effects of wind and increases the overall cooking efficiency of a gas cooker. Finally, because the device extends above the cooking surface, it provides a measure of safety by preventing the accidental movement of a cooking utensil from the cooking surface.

14 Claims, 13 Drawing Sheets

WIND GUARD ATTACHMENT FOR PORTABLE GAS COOKERS

This application claims the benefit of U.S. Provisional Application No. 60/114,423, filed on Dec. 31, 1998.

TECHNICAL FIELD OF THE INVENTION

The instant invention relates generally to portable gas cookers and in particular to an attachment to provide isolation from wind as well as providing a degree of additional safety.

BACKGROUND OF THE INVENTION

Modern Americana has taken to the great outdoors in droves and as a consequence tends to cook meals outside at camping sites, fishing grounds, and the like. Many of these outdoor meals are prepared in pots containing a boiling liquid (water, cooking oil, etc.). Heat for the pot is usually provided by a portable gas cooker utilizing propane (or similar gas) as the source of energy. These portable cookers are rugged, inexpensive, and assume a variety of shapes and sizes set by each manufacturer. Due to their inexpensive construction, the flame is allowed come directly from a burner or gas ring, pass over some form of pot support or grate and fall directly on the bottom of the pot. If any breeze is present, the wind tends to blow the flame away from the pot; thus wasting a majority of the energy, allowing for uneven heating and even the chance that the flame might blow onto an innocent bystander. Thus, there is a need for a universal attachment for portable gas cookers that will provide sheltering from the wind and keep a flame contained under the pot.

PRIOR ART

Traditionally the user of a portable gas stove has not worried about the heat that escapes from under the stove when cooking outdoors. The penalty for ignoring the lost heat is not great except that cooking time will be longer and fuel use will be greater than in a system which concerns itself with heat loss. Furthermore and the past, the user has not been concerned with safety in that the cooking pot could easily be knocked off of the gas cooker. The lack of concern is because the cooking pot is heavy, full of fluid, and the user believes it is less likely to tumble.

There is some prior art in the area of safety devices, but none of the prior art addresses a retrofitable device that would fit nearly any model of portable gas cooking stove. For example, Scott (U.S. Pat. No. 3,960,134—Jun. 1, 1976) discloses a Utensil Holder for a Stove and addresses a device which clips onto a gas burner grate and is intended to restrain the actual cooking utensil. Flames from the gas burner are still able to pass outside the device and beside the utensil. Thus, Scot does not envision or teach efficiency of operation. The Scot device will fit a variety of gas grates and could function well with some of the grates found on modern gas portable cookers providing there is no outer retaining ring, which is not always the case.

Young (U.S. Pat. No. 5,329,917—Jul. 19, 1994) discloses a Fire Ring which is a portable device designed to enclose a camp fire (wood), hold cooking utensils over the fire, and bleed heat to one side to cook meat or similar food. The device is not designed for use with portable gas cooking stoves.

Joseph (U.S. Pat. No. 5,542,347—Aug. 6, 1996) discloses a Fry Pan Cooking Shield and Method which is designed solely to prevent grease splattering out of a frying pan. Although the device will fit varying diameters of pans, it requires a plurality of parts and appears difficult to set up. It real intent is to provide a shield for indoor use; thus, its plurality of parts will easily be lost in the case of outdoor cooking.

Whittead (U.S. Pat. No. 5,682,872—Nov. 4, 1997) discloses a Camping Furnace that is a three part device designed to restrain a camp fire: somewhat like the Young device. A grill may be placed over the device to support cooking utensils and food that is being cooked. Again the device is not designed for use with portable gas stoves.

Hall (U.S. Pat. No. 5,842,463—Dec. 1, 1998) discloses yet another camp fire device. Hall is a multiple part device which is designed to constrain a fire and direct heat towards the cooking utensil. (As does Whittead.) Hall is concerned with the efficiency of the actual combustion process and, through his inner and outer walls, claims that the process is much improved. Hall adds a third element, a chimney, which is designed to reduce heat loss around the cooking utensil and a part of his improved process. Again the device is not designed for use with portable gas cooking stoves.

As stated, none of the prior art is designed for use with portable gas cooking stoves and further none of the prior art is readily adjustable for varying diameters of stove grates nor are any of the devices adjustable in height so that they could fit any portable gas cooking stove/burner assembly.

Thus there remains the need for a device which will improve the operation and safety of any portable gas cooker, that is adjustable in diameter and height, and that is retrofitable to any modern portable gas cooker/fryer.

SUMMARY OF THE INVENTION

The instant invention consists of a single piece of sheet steel which is capable of surrounding the burner support assembly on most portable gas cookers. The single piece wraps around the burner support and is held in a circular shape by a preset to the sheet metal and a spring. The spring allows the instant invention to expand or contract, in diameter, thus adjusting to most cookers. A series of adjustable support brackets hold onto the bottom of the sheet and rest against the top of the burner grate; thus, holding the instant invention vertically in place. The support brackets may be placed in any position along the lower edge of the guard; thus, allowing the guard to universally fit any type of burner support be it a ring, a spoke, or a circular frame. In normal use, the circular guard extends a minimum of three inches above the cooking surface and also serves to retain a cooking pot from being accidentally knocked to the ground possibly scalding a bystander.

DESCRIPTION OF THE PREFERRED EMBODIMENT

Figure 1:
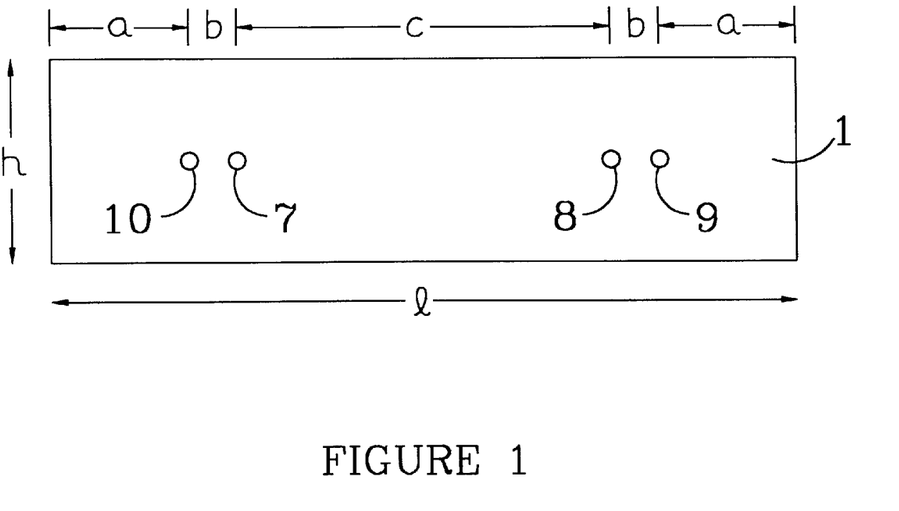
FIG. 1 shows the basic layout of the sheet metal wind shield.
Figure 2:
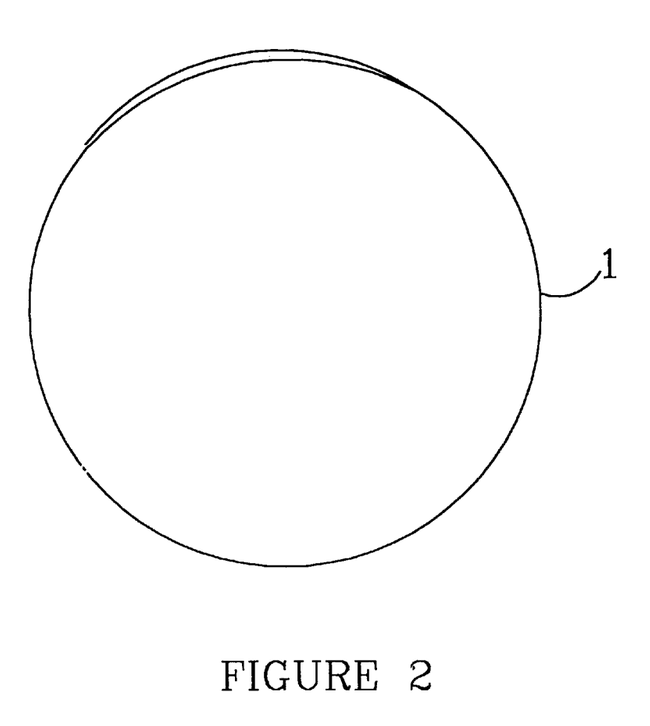
FIG. 2 shows a top (or bottom) view of the sheet metal wind shield rolled within itself.

Referring to FIG. 1, the instant invention, generally item 16, is formed from a single sheet, 1, of preferably 20 gauge (0.0397-inches thick) galvanized sheet metal, although thicker or thinner gauges may be used. Holes or apertures 7, 8, 9 and 10, for the spring attachment hooks, are formed or punched along a line, roughly midway between the top and bottom of the sheet at distances "a", "b" and "c" respectively. The preferred dimensions for the width of the sheet (top to bottom distance) "h" is 6 inches and the preferred length of the sheet "l" is 60 inches. These dimensions may be adjusted to fit other types of cookers, but these values have been found to fit most available cookers. Distances "a", "b" and "c" are preferably set at 13 inches, 7 inches and 20 inches respectively. Again these dimensions may be adjusted to fit other types of cookers, but these values have been found to fit the majority of cookers. The flat sheet is then rolled into an overlapping circle, with a free diameter of roughly 13 inches, as shown in FIG. 2.

The free diameter can be varied and is set by packing requirements (i.e., the size of the box) and burner size. If the free diameter is too small the guard will not properly fit a large cooker; whereas, if the free diameter were too large, the guard would not fit a small cooker. The inventor has determined that 13 inches is an optimum and provides circumferential preset; however, this should not be interpreted as a limitation for the optimum can be varied by several inches in either direction.

Figure 3:
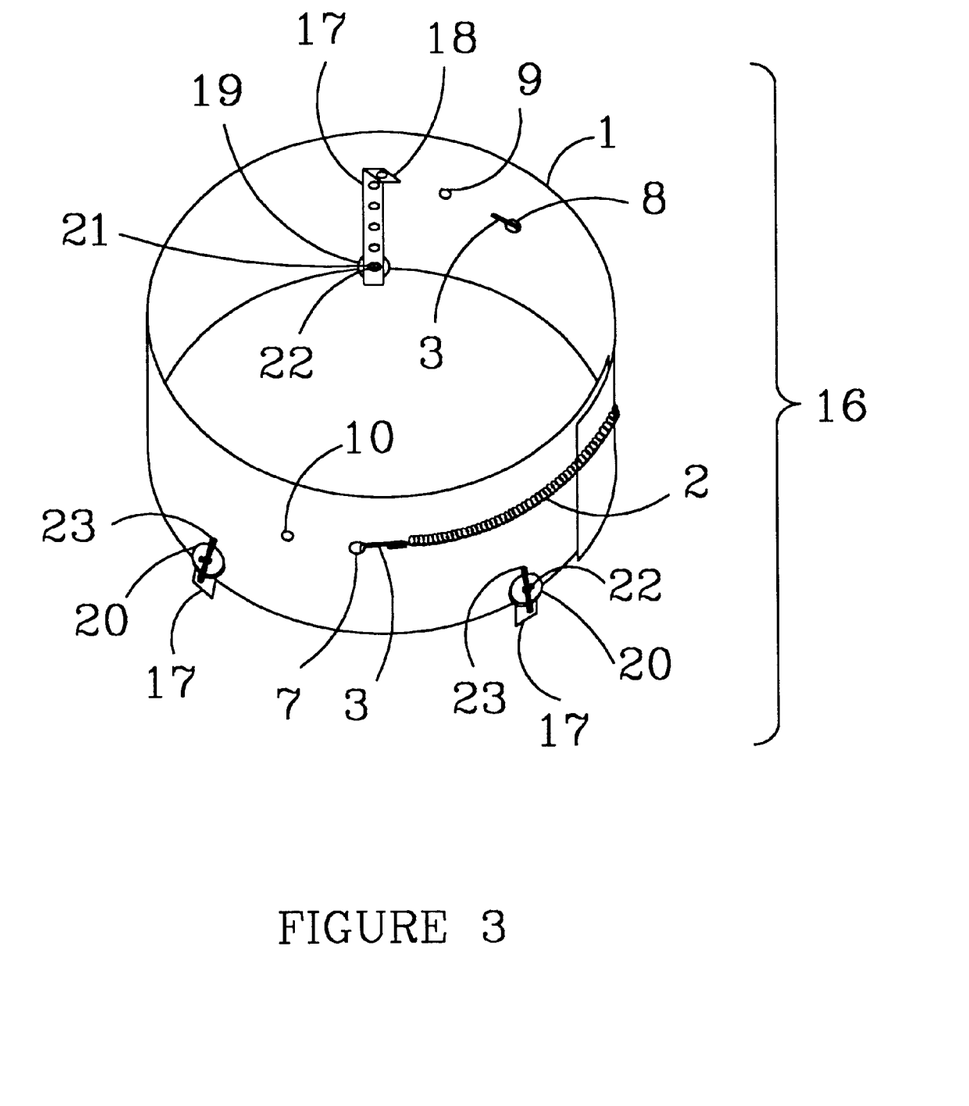
FIG. 3 is an oblique view of the wind guard assembly showing the adjustable support brackets, tension spring and tension spring attachments within their respective paired apertures.
Figure 8:
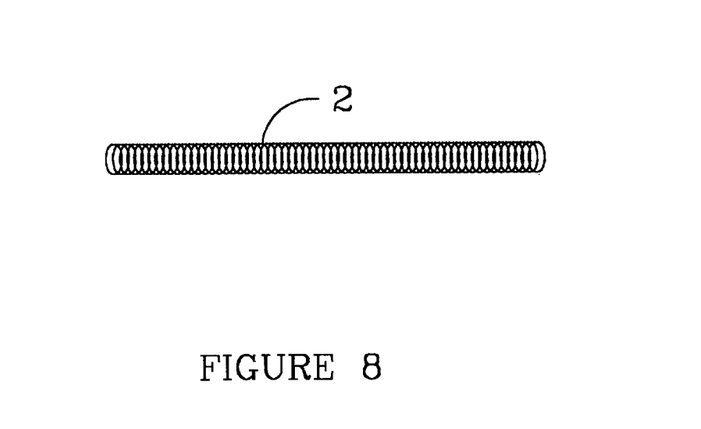
FIG. 8 shows the tension spring.
Figure 9:
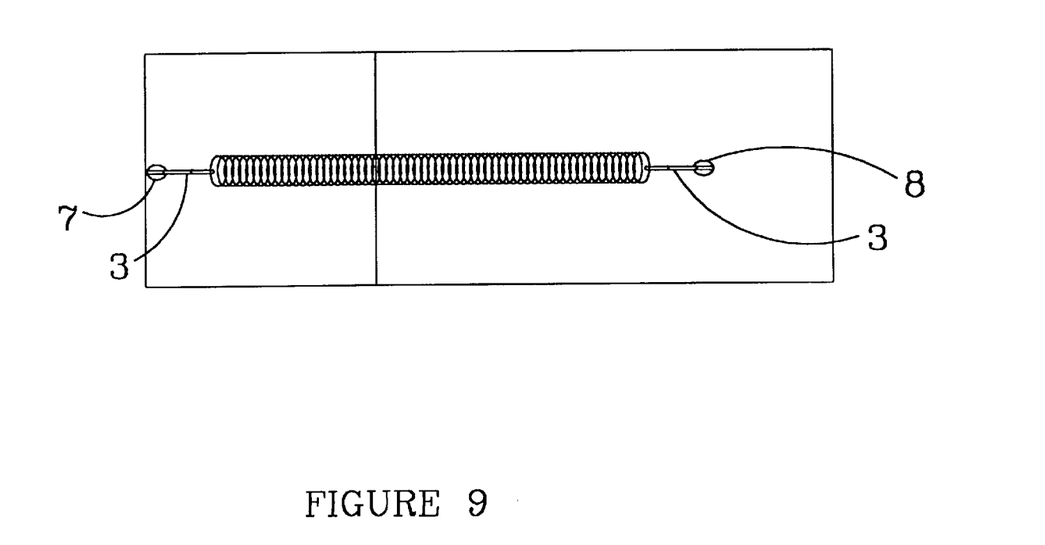
FIG. 9 is a side view of the wind guard assembly illustrating the tension spring and its attachment to the wind shield.
Figure 10:
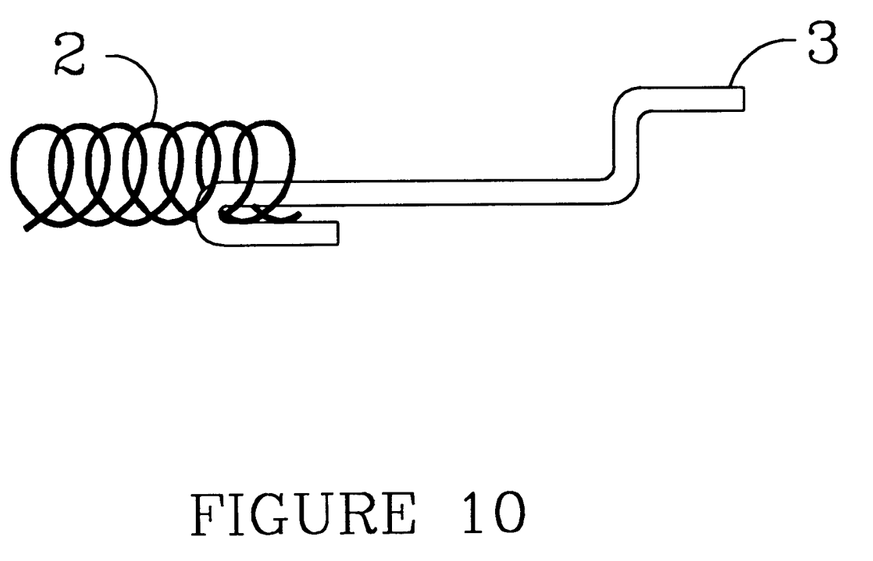
FIG. 10 shows the tension spring and tension spring attachment.
Figure 11:
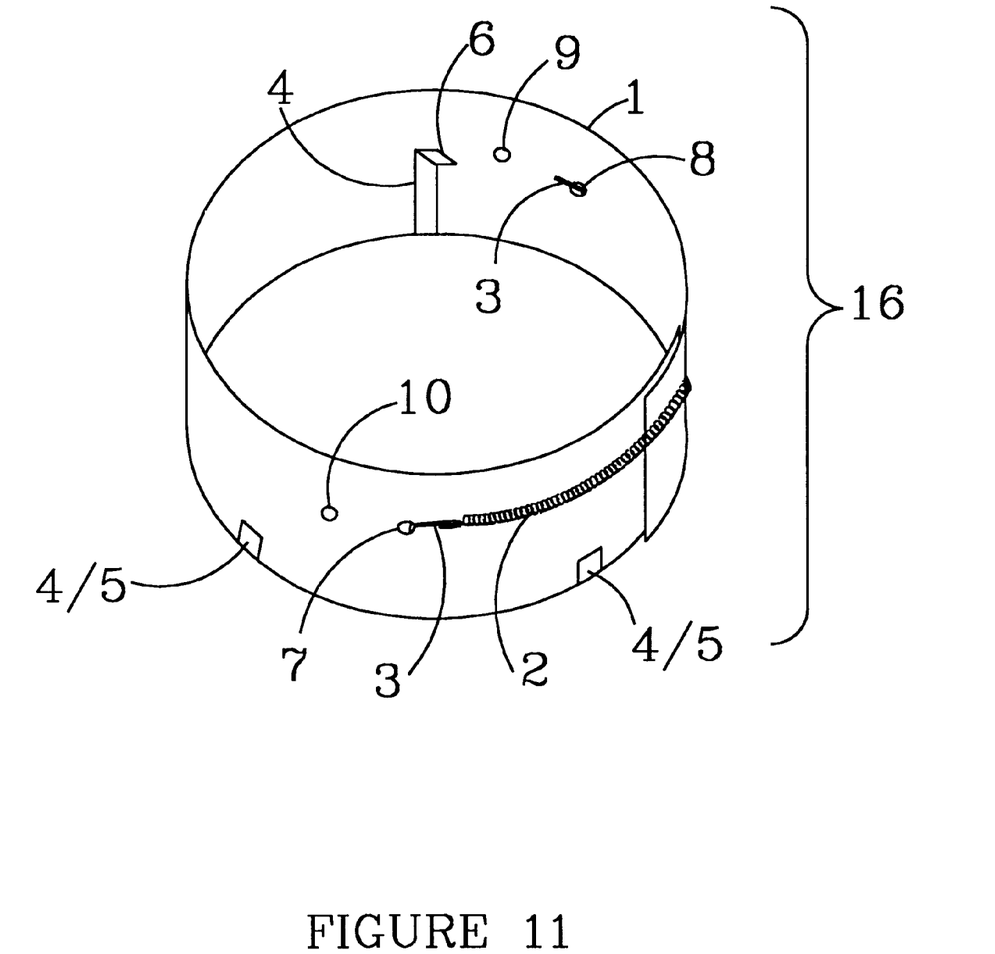
FIG. 11 is an oblique view of the wind guard assembly showing alternate support clips, tension spring and tension spring attachments within their respective apertures.

A tension spring, 2, (see FIG. 8) of approximately 17 inches in length is attached around the outside of the guard as shown in FIG. 9. Special attachment hooks, 3, (see FIG. 10) are fitted at the ends of the tension spring. These hooks are formed from ⅛ inch galvanized wire and hook through paired apertures 7 or 10 and 8 or 9 depending on the diameter of the cooker. A small diameter cooker would use paired apertures 7 and 9; whereas, a larger diameter cooker would use paired apertures 10 and 8. The tension spring provides clamping force around the rim of the cooker and allows for an adjustable diameter. (FIGS. 3, 9, and 11 show the spring hooks engaged in paired apertures 7 and 8.)

Figure 4:
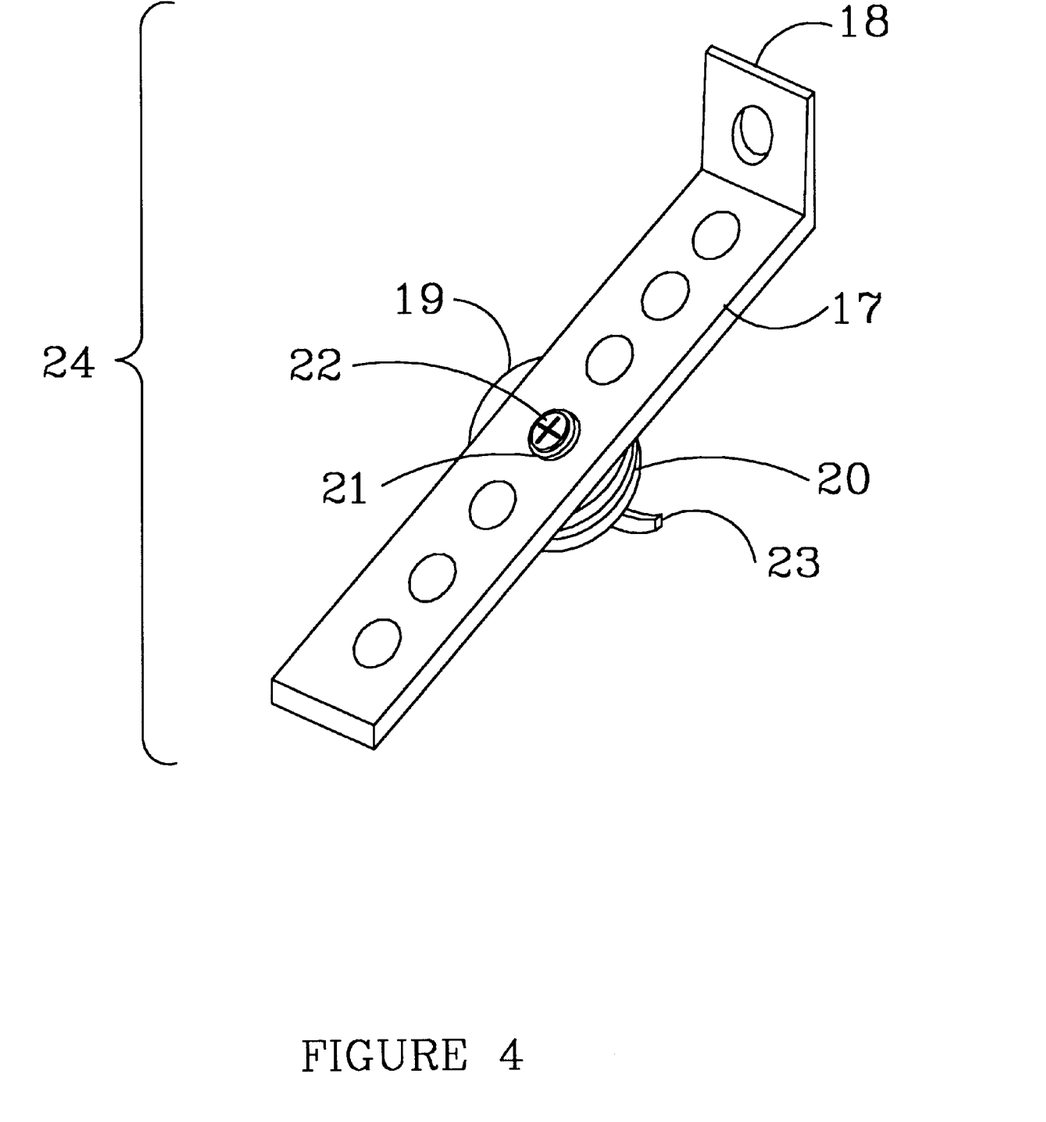
FIG. 4 is an oblique view of the preferred adjustable support bracket assembly.

The tension spring will hold the wind guard assembly around the portable gas cooker and friction will probably hold the device in place against the downward pull of gravity; however, the inventor has found that some technique must be used to ensure that the wind guard remains in a fixed vertical position on the cooker. Because the most effective vertical position for the wind guard will vary with each model of gas cooker, and because the device is designed to be used with any gas cooker, and adjustable support bracket is required. Such a bracket assembly, generally item 24, is shown in FIG. 4.

The adjustable support bracket assembly consists of a support bracket, 17, with a support bracket lip, 18, formed at right angles to the bracket. The support bracket has a plurality of holes or apertures punched along the middle of the bracket that allows, as will be seen, for a broad range of vertical adjustment. (In fact, the bracket can easily be made from standard "pipe-strap" which comes complete with a series of apertures pre-punched in the strap.) A standard bolt, 22, and lock washer, 21, pass through one of the apertures in the bracket. (The actual choice depends on the required vertical height of the wind guard device on the burner assembly.) On the opposite side is placed a standard washer, 19, that serves as a clamping washer. In the preferred embodiment, a second washer, 20, that serves as a "bent" clamping washer is further threaded over the bolt. A standard wing nut, 23, also threaded over the bolt, completes the assembly.

Figure 5:
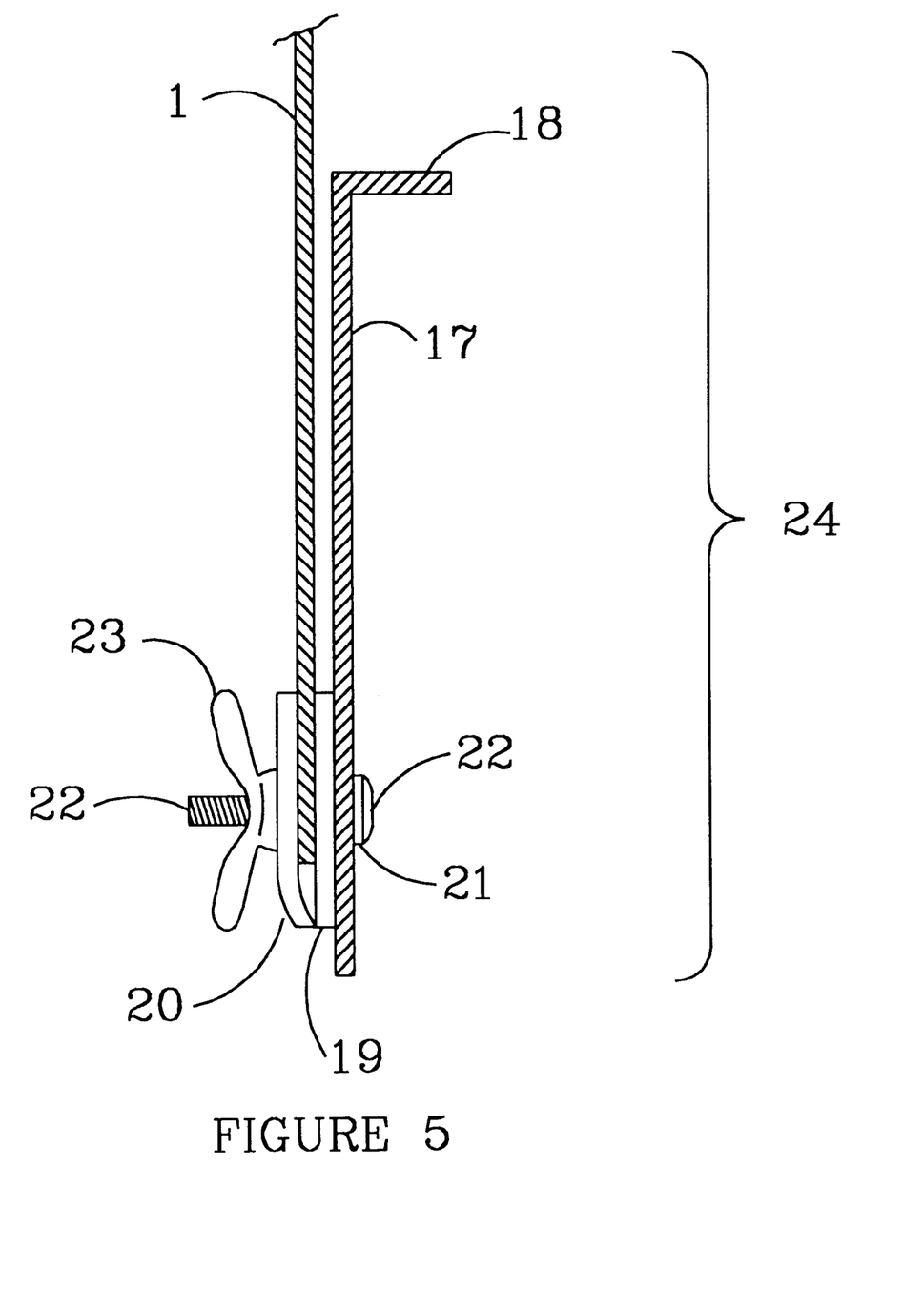
FIG. 5 is a side view of the support bracket in place on the wind guard and showing the operation of the clamping washers.
Figure 6:
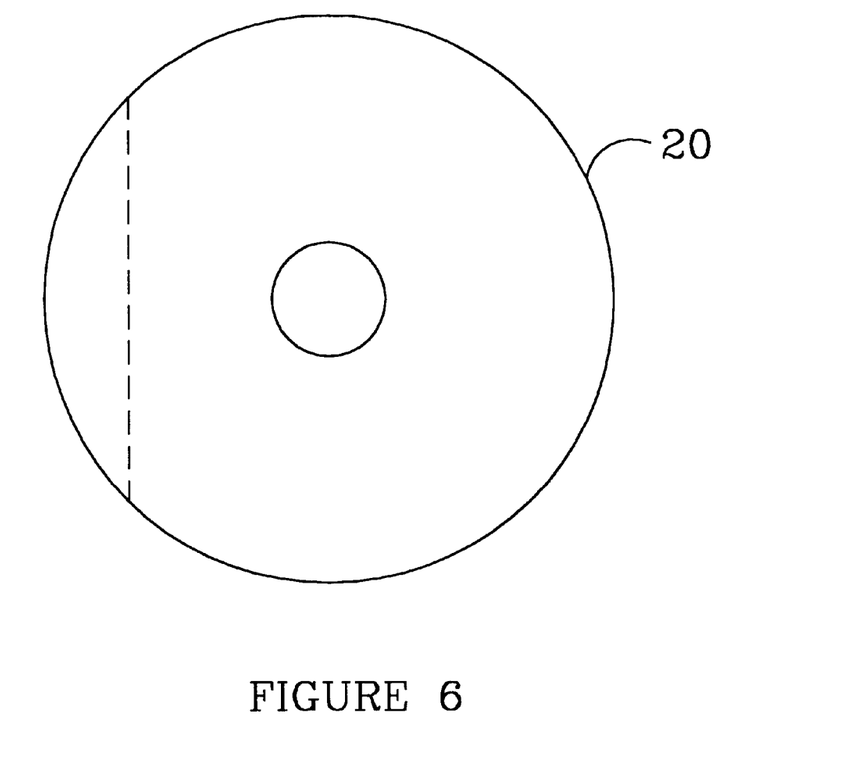
FIG. 6 is a plan view of the bent clamp washer.
Figure 7:
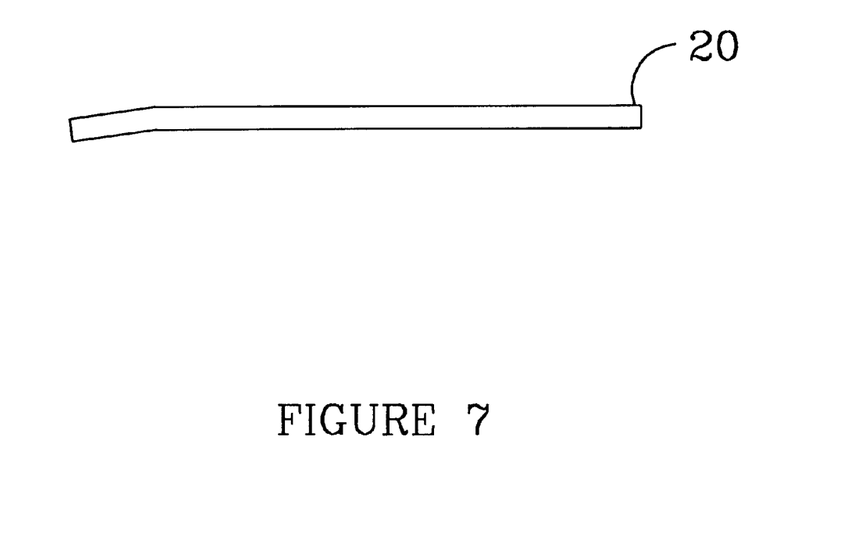
FIG. 7 is a side view of the bent clamp washer illustrating the bend.

The adjustable support bracket assembly, 24, is shown in place on the wind guard, 1, in FIG. 5 which illustrates the action of the bent clamping washer, 20. The slight bend in the washer ensures that the wind guard sheet metal will be held in a parallel position between the two washers and the support bracket. This simple bend means that frictional holding forces will be maximized for minimum screw force exerted by the wing nut when the bracket is attached to the wind guard. FIGS. 6 and 7 illustrate the "bent" clamping washer. NOTE—the device will function equally well with two flat washers; however, slightly more force will have to be applied by the user when tightening the wing nut. In normal circumstances three bracket assemblies are placed at equal distances along the bottom circumference of the wind guard when it is fitted to a gas cooker.

Figure 16A:
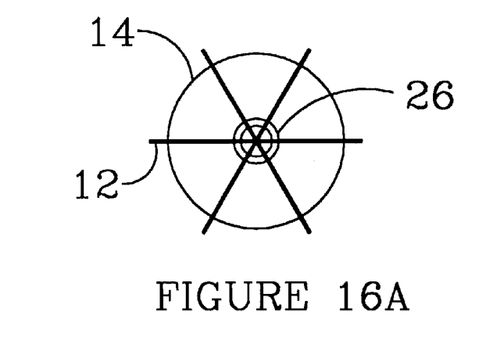
FIG. 16A shows a top view of a gas cooker with a six element burner grill.
Figure 16B:
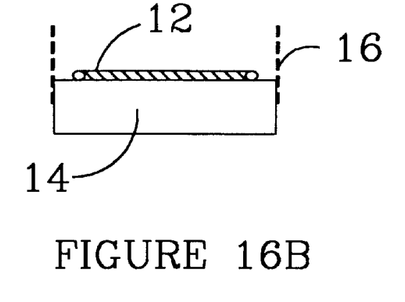
FIG. 16B is a side view of the assembly of FIG. 16A (without legs) and showing the approximate position of the instant device in relation to the grill and the burner.
Figure 17A:
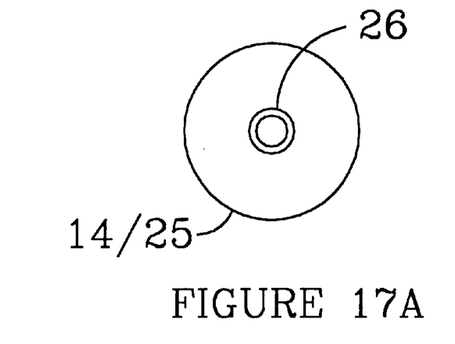
FIG. 17A shows a top view of a gas cooker with a ring type burner grill.
Figure 17B:
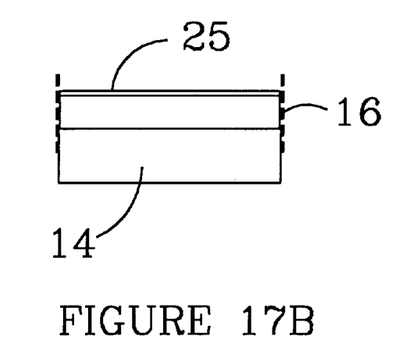
FIG. 17B is a side view of the assembly of FIG. 17A (without legs) and showing the approximate position of the instant device in relation to the grill and the burner.

The device is simple to install on almost any portable gas cooker. Most gas cookers have six spokes, 12, (see FIG. 16A) which form the burner grate or use a ring, 25, around the burner (see FIG. 17A) with the same diameter as the burner assembly forming the burner grate. Some gas cookers use the earlier style burner grill which consists of three triangular shaped pieces of metal welded to a support forming a sort of six-pointed star as the burner grate. In all cases the bracket lip, 18, of the bracket assembly, 24, will catch against an element of the burner grate.

In order to use the wind guard, the user would install the two clamping washers on the three support brackets using the bolt, the lock washer and the wing nuts as illustrated in FIG. 4. The plurality of apertures within the bracket allow for a broad range in vertical adjustment of the wind guard when placed on the gas cooker. In normal installations the bolt would be placed in approximately the center aperture of the support bracket. The actual choice of aperture is based on the height of the burner grate above the gas ring, 26, and the burner frame, 14. The aperture location should be chosen so that the wind guard extends a minimum of three inches above the gas ring/burner frame. In some cases, the gas control valve (not shown) is placed fairly high in the burner frame. If this is the case, the aperture location in the support bracket should be chosen so that the bottom of the wind guard is above the gas control valve. A simple rule of thumb is, "as the bolt location is moved closer to the bracket lip, 18, the higher the wind guard position on the cooker."

To install the device on a cooker, the sheet metal wind shield should be adjusted, by springing it open or closed, to fit snugly around the burner grate (spokes or ring) or burner frame. The guard should then be placed over the grate or frame. Friction forces should hold the guard in place while the support brackets are installed at equidistances around the bottom of the guard. The lips of the brackets should rest against the burner grate (three of six spokes or the ring). Each of the wing nuts should then be tightened, while making certain that the bent edge of the outer clamping washer is towards the bottom to ensure uniform clamping. Finally the spring should be installed with the hook at each end placed in one of the two paired apertures. Ideally the choice of paired apertures should provide a 3 to 6 inch stretch of the spring.

In some gas cookers, the legs are mounted near the top of the frame and will provide the necessary vertical stop for the wind guard. In these models the use of the support brackets is not necessary.

In rare gas cookers, the grate arrangement is such that there are four or eight spokes, In these models a fourth support bracket will be necessary with the brackets being placed equidistant around the shield so that each of the their lips rest on a spoke or the grate.

Figure 12A:
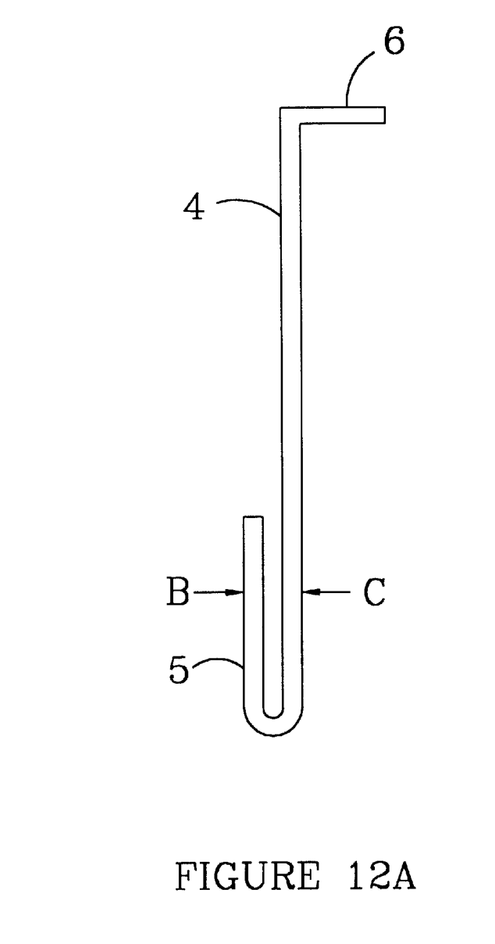
FIG. 12A shows a side view of the alternate support clip.
Figure 12B:
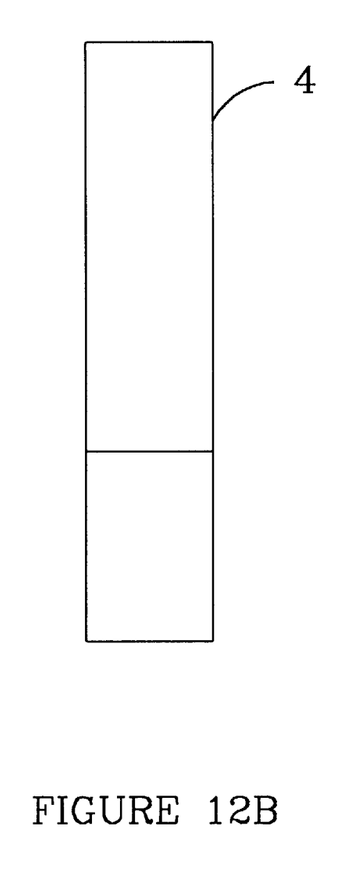
FIG. 12B shows the alternate support clip of FIG. 12A seen from direction B.
Figure 12C:
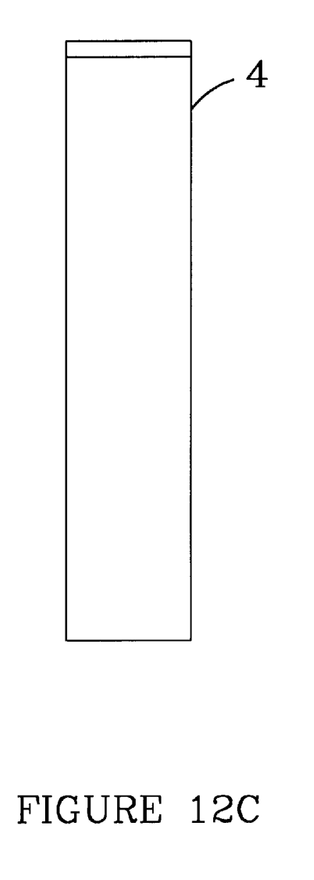
FIG. 12C shows the alternate support clip of FIG. 12A seen from direction C.

In the first alternative embodiment, a plurality of alternate support bracket assemblies, 4, (see FIGS. 12A, 12B and 12C) are provided as part of the instant invention for setting the vertical height of the wind guard assembly. These assemblies are formed from 20 gauge galvanized steel and have a support bracket lip, 6, and a support bracket clip flange, 5. The preferred length of the alternate assembly is 3 inches, the length of the lip and the clip flange is roughly ½ inches, and the preferred width of the assembly is ¾ inch. The assembly clip flange is designed to tightly fit (or slide over) the 20-guage steel which forms the actual guard, 1. The lip will lie against the rim or burner support of the cooker. Thus, the assemblies provide vertical support for the guard. Three such alternate assemblies are shown in place on the guard, 1, in FIG. 11.

Figure 13:
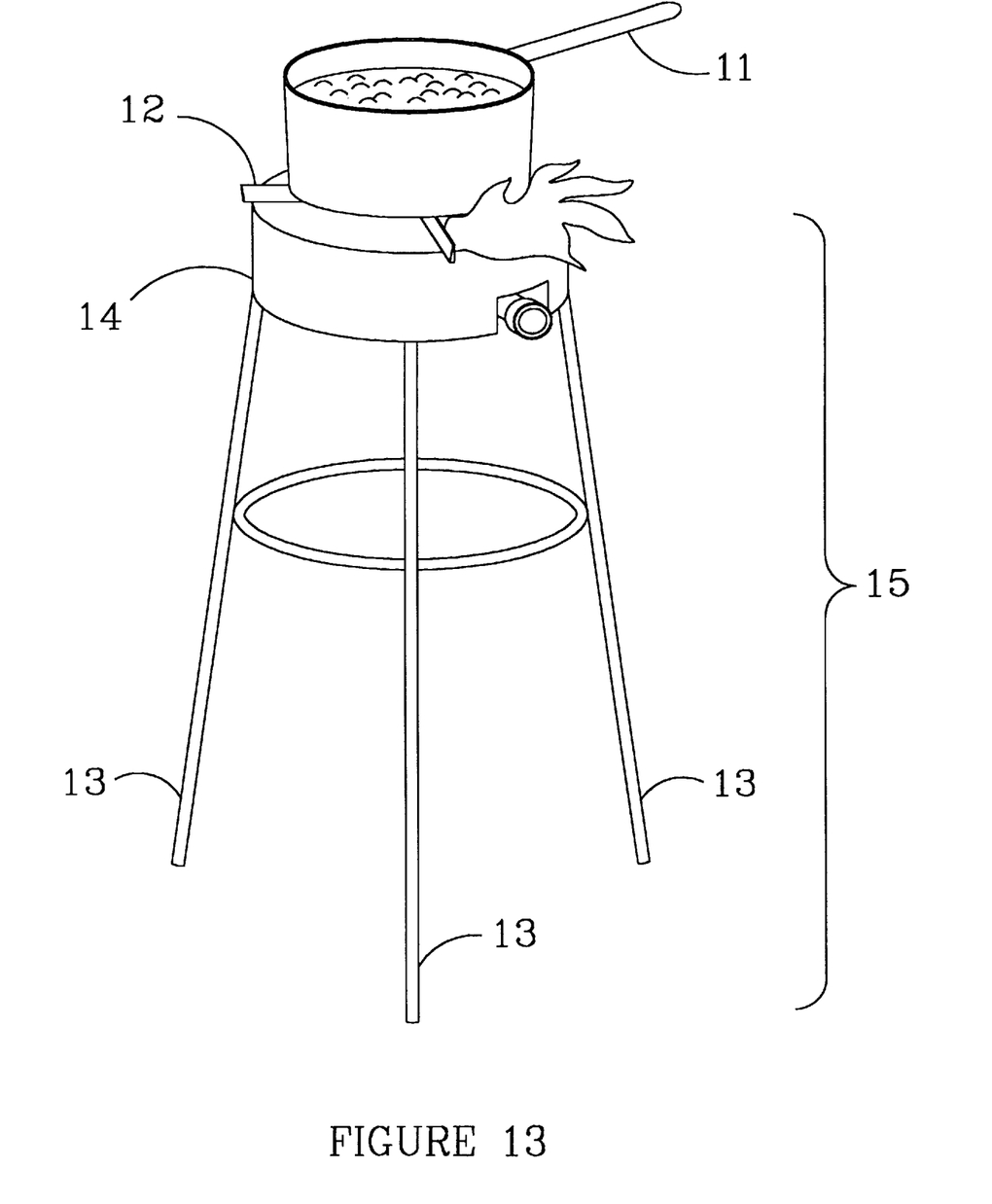
FIG. 13 shows a gas cooker without the instant invention in place showing the effect that wind has on the gas flame.
Figure 14:
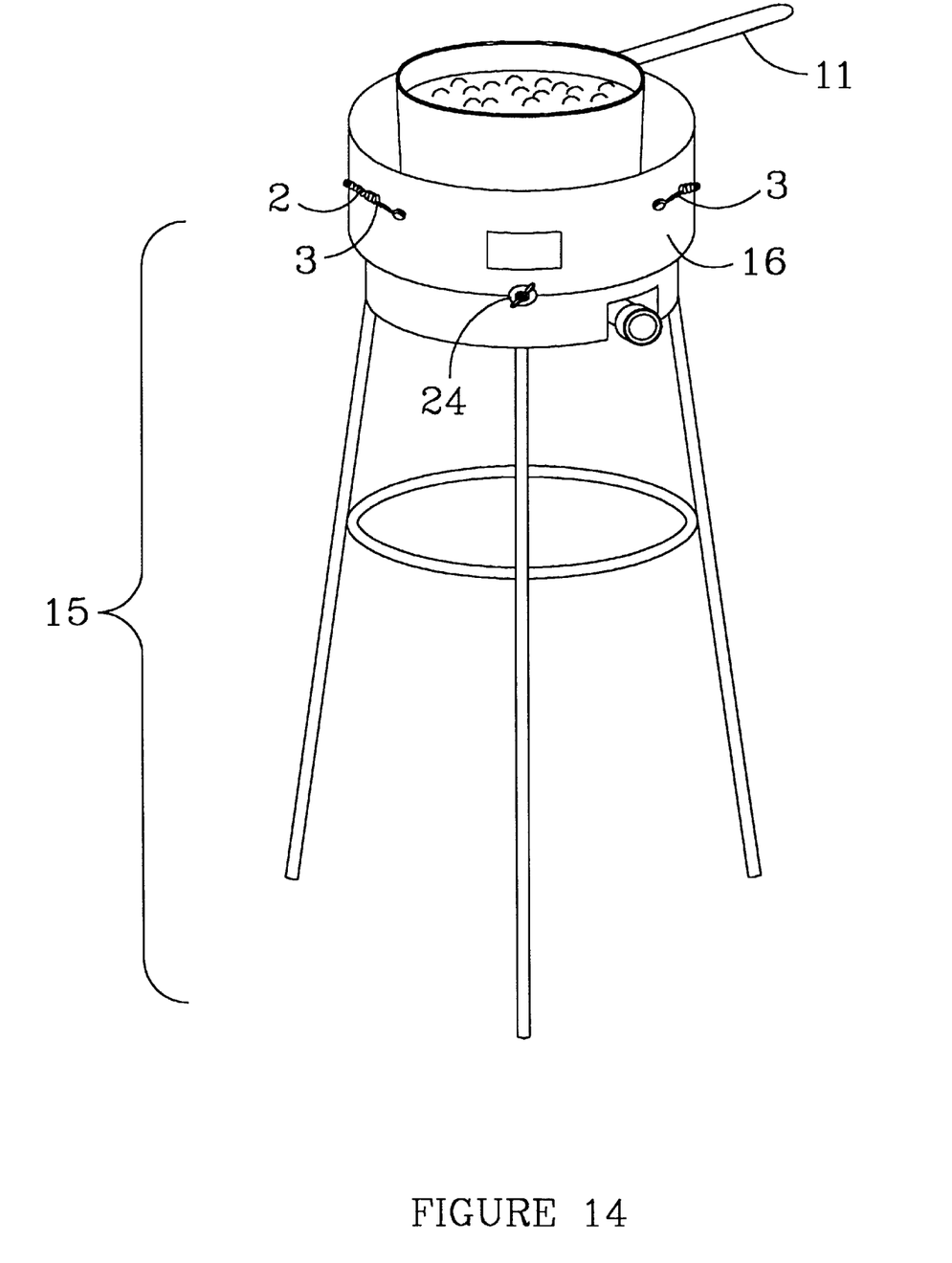
FIG. 14 shows the instant invention in place on the gas cooker of FIG. 13.

In the first alternative device, a minimum of four alternate support assemblies are provided, and it is up to the user to determine if four or less or none should be used. For example (see FIGS. 11 and 13), on some cookers the support legs, 13, attach on the outside of the burner frame, 10, and slope outward. Thus, the guard would come to vertical rest against the support legs. In other cases the burner support is formed from a spoke arrangement of round rods, 12, (three or more spokes) and the user would position three assemblies in such a manner that they would come to rest against each of the spokes which form the cooking surface. The first alternate provides no vertical adjustment; however, the alternate embodiment will work with a majority of modem portable gas cookers.

Figure 15:
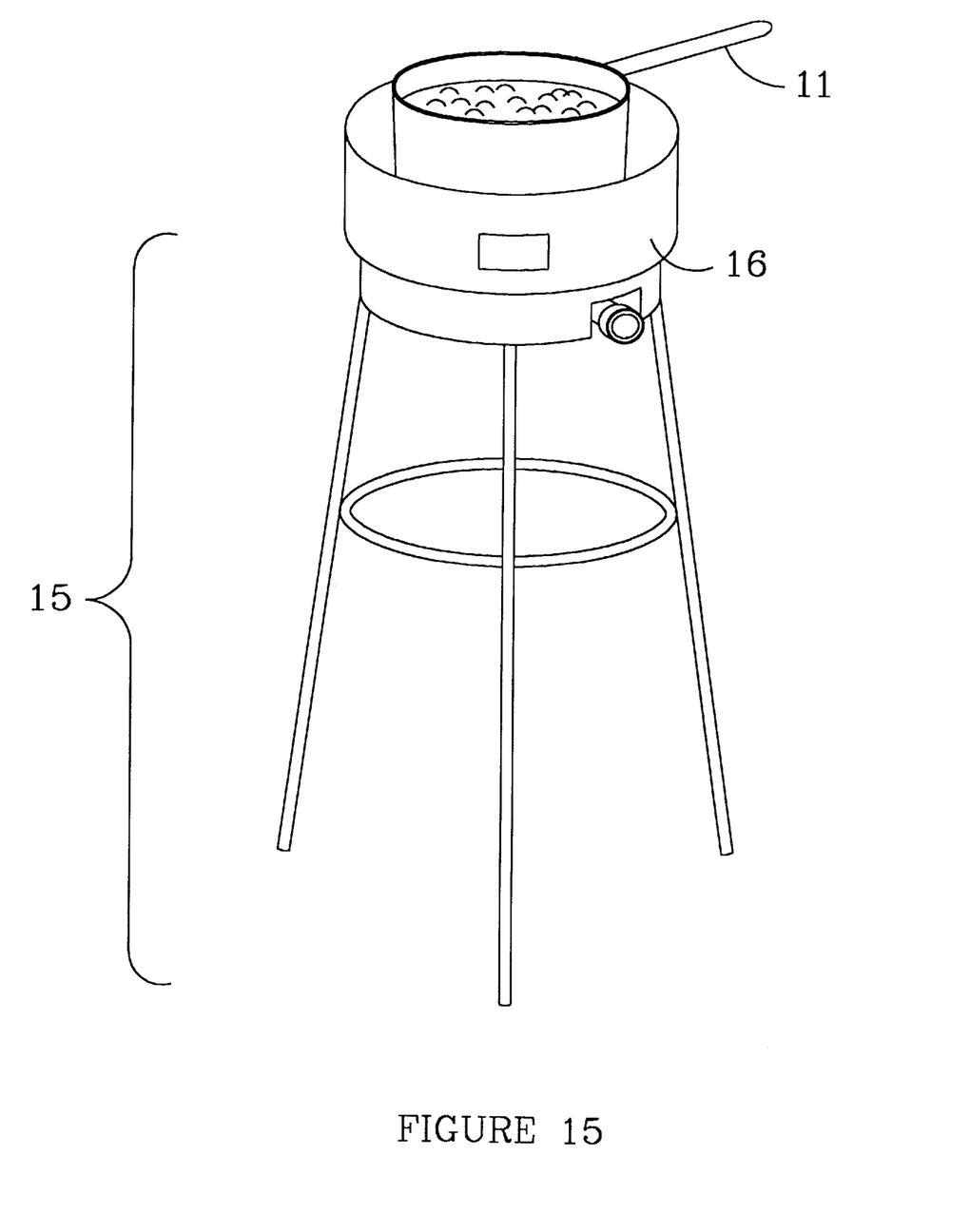
FIG. 15 shows an alternate embodiment of the instant invention permanently mounted in place on the gas cooker of FIG. 13.

In the second alternate embodiment, the user may permanently attach the instant invention to the burner assembly as shown in FIG. 15. In this embodiment, the sheet metal wind shield would be cut to roughly the same diameter as the burner. The two short edges of the sheet metal would be attached together forming a circle. (For example, by tack welding or by riveting.) The device would then be placed over the burner and permanently attached to the burner by any convenient means such as welding, riveting, or even a force fit.

Thus, there has been provided a wind guard that fits all circular style outdoor gas cookers. The preferred embodiment of the instant invention automatically adjusts its diameter to the diameter of the cooker. The device requires no modification to the cooker, no tools are required for installation and the support brackets work on all burner/cooking surfaces whether spoked or circular rim. Two alternate embodiments have been provided, one which is permanently set at the burner diameter and which can be forced fitted or even permanently attached to the burner.

The device saves a significant amount of fuel (up to one-half), cooking time and provides even temperature control. Finally, the device provides an extra measure of safety in that the cooking pot is more securely held on the cooking/burner surface.

The dimensions given in this disclosure should not be interpreted as a limitation and are provided as the best embodiment dimensions. These dimensions may be adjusted up or down to fit other sizes or types of cookers or to strengthen the parts. Finally, all parts should be galvanized to provide an extended life time; however, this is not a requirement. It should be noted that more expensive models may be manufactured using stainless steel or other metals.

I claim:

1. A wind guard attachment for portable gas cookers comprising:

a) a single rolled sheet in the form of a circle therefore including a circumference, and having a top edge, a bottom edge, and an outer wall having a plurality of apertures formed within said outer wall of said rolled sheet, wherein a spring hook may placed within said aperture;

b) means for maintaining said rolled sheet in the form of a circle, wherein said means for maintaining said rolled sheet in said form of a circle comprises a spring having a first end and a second end thereof; wherein a first spring hook is engaged in said first end of said spring and wherein a second spring hook is engaged in said second end of said spring; and wherein said first spring hook is hooked through one of said apertures and said second hook is hooked through another of said apertures; such that said spring stretches along said outer wall circumference of said roll sheet between said spring hooks;

c) means for attaching said rolled sheet to the gas cooker.

2. The apparatus of claim 1 wherein the portable gas cooker has a circular frame with a plurality legs attached to the outside of the frame and wherein said means for attaching said rolled sheet to the gas cooker comprises the steps of:

a) placing said rolled sheet about the circular frame of the portable gas cooker; and, b) allowing said sheet to slide downwards until said bottom edge of said rolled sheet rests against the portable gas cooker legs.

3. A wind guard attachment for portable gas cookers having a circular frame with a plurality of legs attached to the outside of the frame comprising:
   a single rolled sheet in the form of a circle therefore including a circumference, and having a top edge, a bottom edge, an outer wall, a first end and a second end, wherein said rolled sheet is maintained in said form of a circle by attaching said first end to said second end of said rolled sheet, and means for attaching said rolled sheet to the gas cooker;
wherein said means for attaching said rolled sheet to the gas cooker comprises the steps of:
   a) placing said rolled sheet about the circular frame of the portable gas cooker; and,
   b) allowing said rolled sheet to slide downwards until said bottom edge of said rolled sheet rests against the portable gas cooker legs.

4. The apparatus of claim 3 wherein step (b) is replaced by the following step:
   b-1) welding said rolled sheet to the frame of the portable gas cooker.

5. The apparatus of claim 3 wherein step (b) is replaced by the following step:
   b-2) riveting said rolled sheet to the frame of the portable gas cooker.

6. A wind guard attachment for portable gas cookers comprising:
   a) a single rolled sheet in the form of a circle therefore including a circumference, having a top edge, a bottom edge, and outer wall, and wherein said rolled sheet has a plurality of apertures formed within said outer wall of said rolled sheet wherein a spring hook may placed within said aperture;
   b) means for maintaining said rolled sheet in the form of a circle, wherein said means for maintaining said rolled sheet in said form of a circle comprises a spring having a first end and a second end thereof; wherein a first spring hook is engaged in said first end of said spring and wherein a second spring hook is engaged in said second end of said spring; and wherein said first spring hook is hooked through one of said apertures and said second hook is hooked through another of said apertures; such that said spring stretches along said outer wall circumference of said roll sheet between said spring hooks;
   c) plurality of support bracket assemblies; and
   d) means for attaching said support bracket assemblies to said rolled sheet;
wherein said plurality support bracket assemblies are placed equidistant along the circumference of said bottom edge of said rolled sheet.

7. The apparatus of claim 6 wherein each of said plurality of support bracket assemblies comprises:
   a) a support bracket having a top end and a bottom end and plurality of apertures running laterally between said top end and said bottom end thereof;
   b) a lip formed at right angles at said top end therein;
   c) a bolt and lockwasher inserted through one of the plurality of apertures in the direction opposite to said lip formed therein;
   d) a first clamp washer and a second clamp washer placed over said bolt after said bolt is inserted through an aperture; and,
   e) a wing nut placed over said bolt for tightening against the combination of said lockwasher, said support bracket, and said clamp washers.

8. The apparatus of claim 7 wherein said means for attaching said support bracket assemblies to said rolled sheet further having a center comprises:
   a) placing said bottom edge of said rolled sheet between said first clamp washer and said second clamp washer on said support bracket assembly such that said lip of said support bracket faces toward said center of rolled sheet and said wing nut of said support bracket assembly faces away from said center of said rolled sheet; and,
   b) tightening each wing nut on each of said plurality of support bracket assemblies such that said support bracket assembly is held firmly in place on said rolled sheet.

9. The apparatus of claim 8 wherein said second clamp washer is a bent clamp washer having a bend, positioned so that said bend faces away from said bottom edge of said rolled sheet when said support bracket assembly is placed on said rolled sheet metal.

10. The apparatus of claim 6 wherein each of said plurality of support bracket assemblies comprises:
   a) a support bracket having a top end and a bottom end and sides;
   b) a lip formed at right angles at said top end therein; and,
   c) a clip flange formed at said bottom end thereof said clip being on opposite side to said lip.

11. The apparatus of claim 10 wherein said means for attaching said support bracket assemblies to said rolled sheet further having a center comprises:
   a) placing said bottom edge of said rolled sheet into said clip such that said lip of said support bracket faces toward said center of rolled sheet.

12. A wind guard attachment for portable gas cookers comprising:
   a) a single rolled sheet in the form of a circle therefore including a circumference, having a top edge, a bottom edge and an outer wall, having a plurality of apertures formed within said outer wall of said rolled sheet wherein a spring hook may placed within each aperture, said rolled sheet further having two ends being about sixty inches between said ends and about six inches between said edges; and wherein said plurality of said apertures is four, wherein said apertures are formed on said circumference of said rolled sheet midway between said top edge and said bottom edge thereof and wherein said four apertures form two aperture pairs, each aperture of each aperture pair being separated by about seven inches, said aperture pairs being separated about twenty inches and each aperture pair being about thirteen inches from said ends of said rolled sheet;
   b) means for maintaining said rolled sheet in the form of a circle;
   c) plurality of support bracket assemblies; and
   d) means for attaching said support bracket assemblies to said rolled sheet;
wherein said plurality support bracket assemblies are placed equidistant along the circumference of said bottom edge of said rolled sheet.

13. A wind guard attachment for portable gas cookers comprising:
   a) a single rolled sheet in the form of a circle therefore including a circumference and having a center, having a top edge and a bottom edge and ends, being about sixty inches between ends and six inches between edges, having an outer wall with two aperture pairs formed on said circumference of said rolled sheet midway between said top edge and said bottom edge thereof, and wherein each aperture of each aperture pair being separated by about seven inches, said aperture pairs being separated about twenty inches and each aperture pair being about thirteen inches from said ends of said rolled sheet;

b) a spring having a first end and a second end thereof wherein a first spring hook is engaged in said first end of said spring and wherein a second spring hook is engaged in said second end of said spring, wherein said first spring hook is hooked through one of said apertures and said second hook is hooked through another of said apertures such that said spring stretches along said outer wall circumference of said roll sheet between said spring hooks, said spring maintaining said rolled sheet in the form of a circle; and, c) three support bracket assemblies, each assembly therewith having a support bracket having a top end and a bottom end and plurality of apertures running laterally between said top end and said bottom end thereof, having a lip formed at right angles at said top end therein, having a bolt and lockwasher inserted through one of the plurality of apertures in the direction opposite to said lip formed therein, having a first clamp washer and a second clamp washer placed over said bolt after said bolt is inserted through an aperture and having a wing nut placed over said bolt for tightening against the combination of said lockwasher, said support bracket, and said clamp washers;

wherein said three support bracket assemblies are attached equidistant along the circumference of said bottom edge of said rolled sheet by placing said bottom edge of said rolled sheet between said first clamp washer and said second clamp washer on said support bracket assembly such that said lip of said support bracket faces toward said center of rolled sheet, and said wing nut of said support bracket assembly faces away from said center of said rolled sheet, by tightening each wing nut on each of said plurality of support bracket assemblies such that said support bracket assembly is held firmly in place on said rolled sheet.

14. The apparatus of claim 13 wherein said second clamp washer is a bent clamp washer having a bend, positioned so that said bend faces away from said bottom edge of said rolled sheet when said support bracket assembly is placed on said rolled sheet metal.

* * * * *